(12) United States Patent
Fei et al.

(10) Patent No.: US 7,788,718 B1
(45) Date of Patent: Aug. 31, 2010

(54) METHOD AND APPARATUS FOR DETECTING A DISTRIBUTED DENIAL OF SERVICE ATTACK

(75) Inventors: Aiguo Fei, San Jose, CA (US); Kai Sun, Mountain View, CA (US); Fengmin Gong, Livermore, CA (US)

(73) Assignee: McAfee, Inc., Santa Clara, CA (US)

( * ) Notice: Subject to any disclaimer, the term of this patent is extended or adjusted under 35 U.S.C. 154(b) by 1259 days.

(21) Appl. No.: 10/171,937

(22) Filed: Jun. 13, 2002

(51) Int. Cl.
*G06F 12/14* (2006.01)
*G06F 12/16* (2006.01)
*G08B 23/00* (2006.01)

(52) U.S. Cl. .............. 726/22; 726/14; 726/23; 726/25

(58) Field of Classification Search .............. None
See application file for complete search history.

(56) References Cited

U.S. PATENT DOCUMENTS

| | | | |
|---|---|---|---|
| 5,557,742 A | 9/1996 | Smaha et al. | |
| 5,621,889 A | 4/1997 | Lermuzeaux et al. | |
| 5,769,942 A | 6/1998 | Maeda | |
| 5,798,706 A | 8/1998 | Kraemer et al. | |
| 5,805,801 A | 9/1998 | Holloway et al. | |
| 5,812,763 A | 9/1998 | Teng | |
| 5,864,683 A | 1/1999 | Boebert et al. | |
| 5,892,903 A | 4/1999 | Klaus | |
| 5,898,830 A | 4/1999 | Wesinger, Jr. et al. | |
| 5,905,859 A | 5/1999 | Holloway et al. | |
| 5,919,257 A | 7/1999 | Trostle | |
| 5,919,258 A | 7/1999 | Kayashima et al. | |
| 5,940,591 A | 8/1999 | Boyle et al. | |
| 6,052,788 A | 4/2000 | Wesinger, Jr. et al. | |
| 6,088,804 A | 7/2000 | Hill et al. | |
| 6,119,236 A | 9/2000 | Shipley | |
| 6,154,844 A | 11/2000 | Touboul et al. | |
| 6,178,509 B1 | 1/2001 | Nardone et al. | |
| 6,185,678 B1 | 2/2001 | Arbaugh et al. | |
| 6,185,689 B1 | 2/2001 | Todd, Sr. et al. | |
| 6,243,815 B1 | 6/2001 | Antur et al. | |
| 6,301,699 B1 | 10/2001 | Hollander et al. | |
| 6,807,159 B1 * | 10/2004 | Shorey et al. | 370/318 |

(Continued)

OTHER PUBLICATIONS

Giovanni Vigna, et al., "NetSTAT: A Network-Based Intrusion Detection System," Department of Computer Science, *University of California Santa Barbara*, pp. 1-46. Supported under Agreement No. F30602-97-1-0207.

(Continued)

*Primary Examiner*—Benjamin E Lanier
(74) *Attorney, Agent, or Firm*—Zilka-Kotab, PC

(57) ABSTRACT

A method of identifying a distributed denial of service attack is described in which a rate profile is determined, where the rate profile corresponds to information transfer rates at which information is received from a network. A burst magnitude threshold based on this rate profile is then established. A burst duration profile characterizing periods of time during which the information transfer rate exceeds this burst magnitude threshold is also calculated, and a burst duration threshold is then defined based upon this burst duration profile. A distributed denial of service attack is identified when the information transfer rate exceeds the burst magnitude threshold for a period of time exceeding the burst duration threshold.

35 Claims, 5 Drawing Sheets

U.S. PATENT DOCUMENTS

2002/0032871 A1* 3/2002 Malan et al. .............. 713/201
2003/0037141 A1* 2/2003 Milo et al. .............. 713/201

OTHER PUBLICATIONS

Y. F. Jou, et al., and S.F. Wu, et al., "Design and Implementation of a Scalable Intrusion Detection System for the Protection of Network Infrastructure," *Advanced Networking Research*, MCNC, RTP, NC, et al., pp. 15.

Ivan Krsul, "Computer Vulnerability Analysis Thesis Proposal," The COAST Laboratory, Department of Computer Sciences, *Purdue University*, IN, Technical Report CSD-TR-97-026. Apr. 15, 1997, pp. 1-23.

Matt Bishop, "Vulnerabilities Analysis," Department of Computer Science, *University of California at Davis*, pp. 1-12.

Matt Bishop, "A Taxonomy of UNIX System and Network Vulnerabilities," *CSE-95-10*, May 1995, pp. 17.

Matt Bishop, et al., "A Critical Analysis of Vulnerability Taxonomies," *CSE-96-11*, Sep. 1996, pp. 1-14.

Dawn X. Song, et al., "Advanced and Authenticated Marking Schemes for IP Traceback," Report No. UCB/CSD-00-1107, Computer Science Division (EECS), *University of California*, Berkeley, Jun. 2000, pp. 1-11.

Chien-Lung Wu, et al., IPSec/PHIL (Packet Header Information List): Design, Implementation, and Evaluation, *NC State University*, Raleigh, NC, et al., pp. 6.

Allison Mankin, et al., "On Design and Evaluation of "Intention-Driven" ICMP Traceback," *USC/ISI*, et al., pp. 7.

Brian Carrier, et al., "A Recursive Session Token Protocol for Use in Computer Forensic and TCP Traceback," CERIAS, *Purdue University*, West Lafayette, IN, et al., 2002 IEEE, pp. 7.

Stefan Savage, et al., "Practical Network Support for IP Traceback," Department of Computer Science and Engineering, *University of Washington*, Seattle, WA. Copyright 2000, pp. 12.

Diheng Qu, et al., "Statistical Anomaly Detection for Link-State Routing Protocols," Computer Science Department, *North Carolina State University*, Raleigh, NC, et al.., Supported under Contract No. F30602-96-C-0325, pp. 9.

* cited by examiner

METHOD AND APPARATUS FOR DETECTING A DISTRIBUTED DENIAL OF SERVICE ATTACK

BRIEF DESCRIPTION OF THE INVENTION

This invention relates to computer network security. More specifically, this invention relates to a method and apparatus for protecting networked devices against distributed denial of service (DDOS) attacks from other computers.

BACKGROUND OF THE INVENTION

Many modern networked computers are vulnerable to DDOS attacks, in which an attacker employs a large number of remotely controlled computers to deluge a target computer with an excessive amount of information. This information usually takes the form of specially crafted Internet Protocol (IP) packets that trigger a flood of packets at the target. The sheer number of such requests overwhelms the target's ability to respond, effectively removing it from service by preventing it from doing anything else. Compounding this problem is the fact that damage from such DDOS attacks is not limited to the target itself. Rather, attacks are also capable of overwhelming any networked device in the path leading to the target. Although the target resource is referred to as a computer, the term computer as used herein includes any networked resource, including storage devices, switches, and routers.

A typical DDOS attack is characterized by a sudden increase, or burst, in traffic volume, i.e. an increase in the rate (often measured in packets per second or bytes per second) at which information is transferred across a network to the target computer. One method of detecting DDOS attacks relies upon detecting and measuring such a burst. However, one difficulty lies in differentiating between a DDOS burst and a legitimate increase in network traffic, say when a target computer receives a large file it is expecting.

It is therefore desirable to develop a method of detecting a DDOS attack that adapts to the typical traffic pattern, or profile, of the target computer. Armed with information on the target's typical traffic profile, such a method could then better discriminate between innocuous data bursts that tend to occur during periods of high traffic, and malicious DDOS attacks. It could also more accurately detect lower level DDOS attacks during periods of low traffic. In this manner, such a method would be more likely to avoid raising a false alarm for a legitimate burst, such as a file transfer during working hours. Likewise, the method would also be more likely to catch even small DDOS attacks at times when network traffic is typically light, such as weekends or late nights.

SUMMARY OF THE INVENTION

A method of identifying a distributed denial of service attack is described in which a rate profile is determined, where the rate profile corresponds to information transfer rates at which information is received from a network. A burst magnitude threshold based on this rate profile is then established. A burst duration profile characterizing periods of time during which the information transfer rate exceeds this burst magnitude threshold is also calculated, and a burst duration threshold is then defined based upon this burst duration profile. A distributed denial of service attack is identified when the information transfer rate exceeds the burst magnitude threshold for a period of time exceeding the burst duration threshold.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

An embodiment of the present invention is directed toward an apparatus and method for adaptively detecting DDOS attacks by monitoring the rate at which data, such as IP packets, are received. A profile is designed to illustrate how this rate is distributed. Such a profile is configured to illustrate the normal, or expected, rates at which information is received. A corresponding profile is also generated to reflect the duration at which this data rate exceeds a certain threshold. In this manner, a DDOS attack is defined as a data rate that matches or exceeds the high end of the rate profile, and that lasts for a period of time matching or exceeding the high end of the duration profile. It should be noted here that the present invention includes the detection of DDOS attacks via the characterization of any type of rate at which information may be transferred. These rates include, without limitation, such examples as packet rate, byte rate, request rate, and the like.

In keeping with this embodiment of the invention, data rate information is also stored and used to update the rate profile. Likewise, duration information corresponding to the length of time during which the data rate exceeds a certain threshold is stored and used to update the duration profile. In this manner, the rate and duration profiles dynamically adjust to changes in data transfer rate, thus providing an up-to-date description of the expected data rate. Such updated profiles allow for DDOS attack criteria to more closely track normal fluctuations in data rate, thus increasing the accuracy with which DDOS attacks are detected.

In further keeping with this embodiment of the invention, note that the buffering or accumulation of individual packets, or any actual information sent across the network, is not required. In fact, rate samples need not even be stored individually. Instead, this embodiment only stores a record of the number of rate or traffic volume samples taken, data that can simply be recorded by a relatively small number of counters or the like. For example, if rate samples are taken at an interval of one second, individual storage of these samples would require 60*60=3600 units of storage. In contrast, the range of rates can be divided into, say, 20 segments, requiring only 20 counters to store an entire hour of information. Therefore, the various processes of the invention require only a small memory footprint and low processing power. This makes the various programs of the invention more easily implemented on individual computers without the need for powerful processors, large amounts of memory, disk arrays, or the like.

Figure 1:
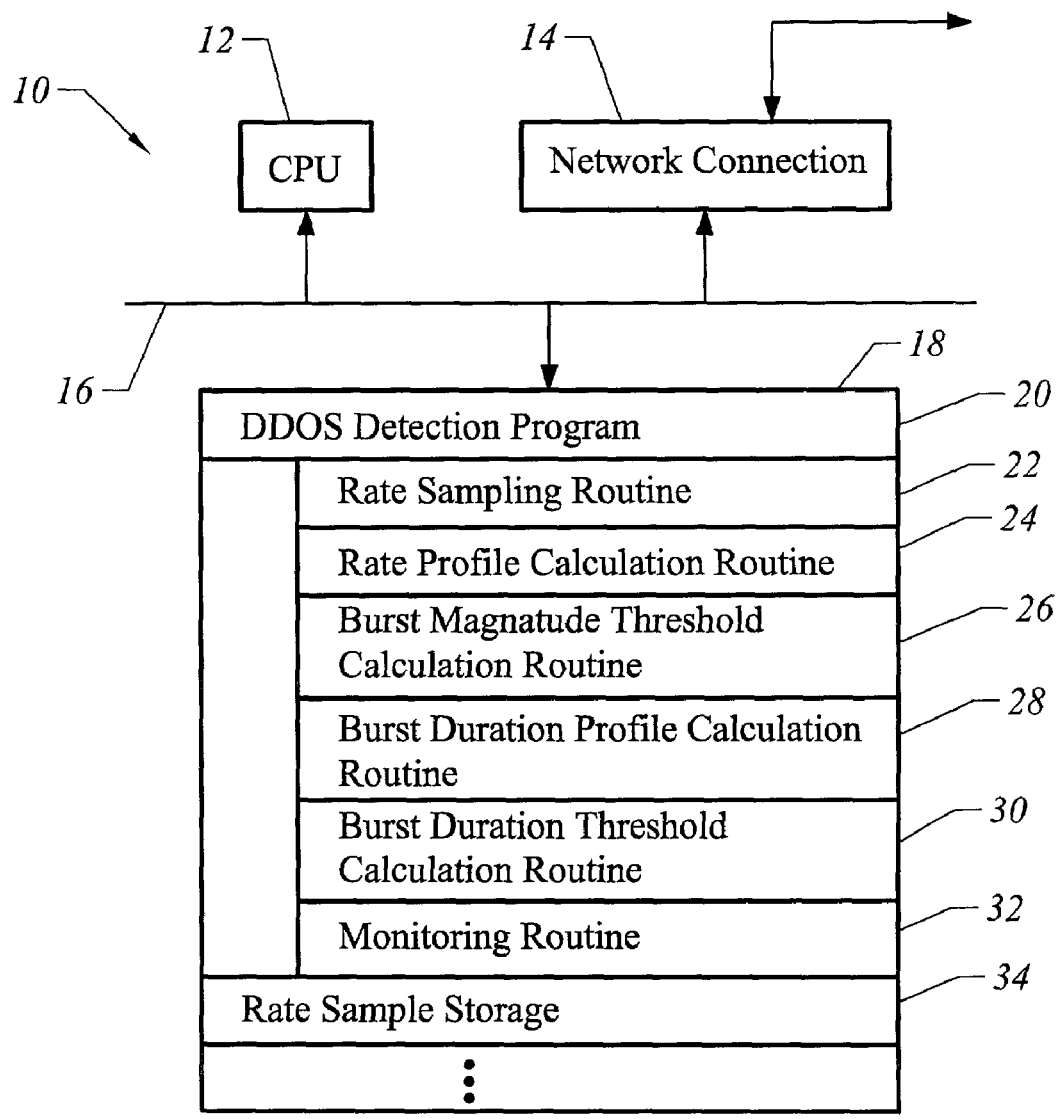
FIG. 1 illustrates a general-purpose computer configured to execute methods in accordance with an embodiment of the invention.

FIG. 1 illustrates a networked computer 10 designed in accordance with an embodiment of the invention. The computer 10 includes a central processing unit (CPU) 12 that executes instructions to carry out the invention, and a network connection 14 for transferring data over a network. The CPU 12 and network connection 14 communicate over a bus 16, which also connects to a memory (primary and/or secondary memory) 18 that stores instructions to carry out the various steps of the invention. The memory 18 in turn stores a DDOS detection program 20 for detecting DDOS attacks. This DDOS detection program 20 contains a number of routines for executing various aspects of DDOS detection. Included are a rate sampling routine 22, a rate profile calculation routine 24, a burst magnitude threshold calculation routine 26, a burst duration profile calculation routine 28, a burst duration threshold calculation routine 30, and a monitoring routine 32. Also included in the memory module 18 is a rate sample storage 34 for storing rate information.

Figure 2:
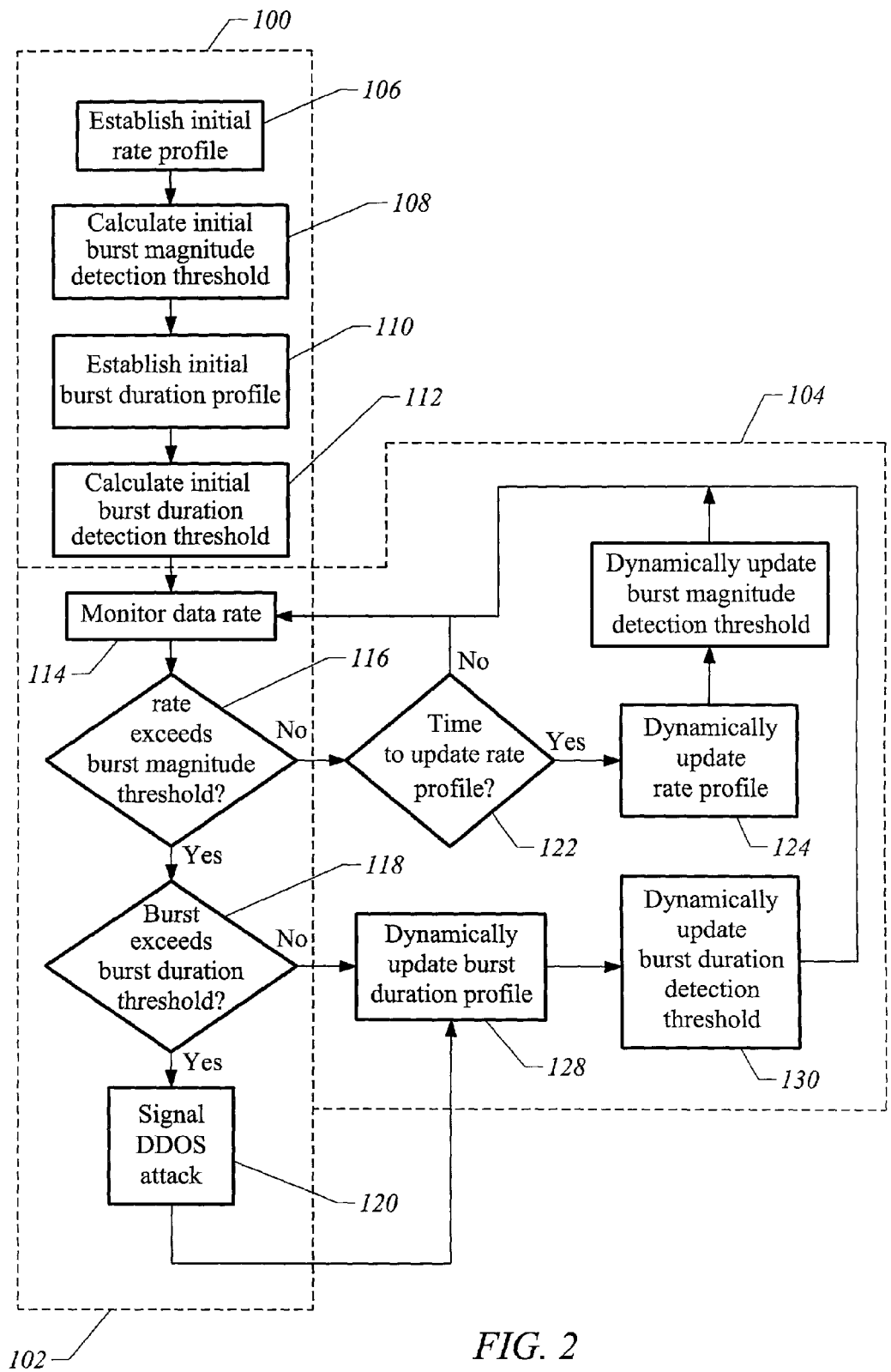
FIG. 2 is a flowchart illustrating initialization, execution, and updating operations performed in accordance with an embodiment of the invention.

FIG. 2 illustrates various steps performed by the computer 10 in accordance with an embodiment of the invention. It is convenient to think of this embodiment of the DDOS detection program 20 as executing at least three different processes: 1) an initialization process 100, 2) an execution process 102, and 3) an updating process 104. The initialization process 100 establishes the initial criteria for a DDOS burst, whereupon the execution process 102 scans for a burst meeting these criteria. Periodically, the updating process 104 updates these criteria to adapt them to changes in data traffic.

The initialization process 100 typically occurs prior to the other two processes 102, 104. As mentioned above, the rate profile calculation routine 24 establishes an initial rate profile illustrating how the data rate is typically distributed (step 106). In this manner, the rate profile may show that the computer 10 typically receives information at a certain rate, which may vary by an amount but which normally neither rises above nor falls below certain levels. The rate profile calculation routine 24 then uses the initial rate profile to calculate a burst magnitude threshold signifying a data rate above which a burst is deemed to occur (step 108). This threshold is typically chosen as a value at the high end of the burst profile. In this manner, relatively small increases in data rate (usually corresponding to normal traffic fluctuations) will commonly fall below the burst magnitude threshold, whereas large and sudden increases will exceed it and thus be labeled as bursts.

The burst duration profile calculation routine 28 also establishes an initial burst duration profile illustrating how long data bursts typically last (step 110). This profile is then used to determine a burst duration threshold (step 112), which is typically a value at the high end of the burst duration profile. Because the burst duration threshold is chosen at the high end of the burst duration profile, it is expected that most legitimate data bursts will be of shorter duration and, thus, fall under the threshold. The burst magnitude threshold and burst duration threshold collectively define criteria allowing for more accurate detection of DDOS attacks. Specifically, while a burst can be simply any increase in data rate, not all bursts are large enough or of sufficient duration to imply a DDOS attack. Rather, a DDOS attack is signaled only when the computer 10 receives a burst that exceeds the burst magnitude threshold for a period of time exceeding the burst duration threshold.

Once the initialization process 100 is completed, the execution process 102 begins. Armed with the above threshold values, the monitoring routine 32 periodically samples the data rate across the network connection 14 (step 114). The resulting data rate samples are then compared against the burst magnitude threshold (step 116). If the data rate exceeds this magnitude threshold, it is monitored to determine whether it also exceeds the burst duration threshold (step 118). If the burst exceeds both these thresholds, a DDOS attack is signaled (step 120).

Attention now turns to the third process 104, namely rate profile updating. Periodically during the monitoring of step 114, the DDOS detection program 20 checks to determine whether it should update the rate profile (step 122). This updating can be done as often or as seldom as desired without deviating from the scope of the invention, but more frequent updates result in a rate profile that more accurately reflects current traffic conditions. If it is not yet time to update the rate profile, the program 20 simply returns to step 114 and continues to monitor the data rate. If it is time to update the rate profile, the program 20 does so by updating the rate profile (step 124). The new rate profile updates the burst magnitude threshold (step 126). The updated burst magnitude threshold is then used to scan for a data burst (step 114). In this manner, the updating process 104 acts to periodically update the rate profile, and thus the burst magnitude threshold, so that they continually reflect current data rates. That is, this embodiment of the invention actively shifts the rate profile up or down so as to adapt to changes in traffic. In this manner, the detection program 20 constantly adjusts its definition of a DDOS attack to fit current traffic, thus making DDOS detection more accurate.

In the present embodiment, the updating process 104 also includes a method for updating the burst duration threshold. Once a burst exceeding the burst magnitude threshold is detected, it is monitored to assess its duration, i.e. the length of time for which the data rate exceeds the burst magnitude threshold. The duration of this burst is recorded and used to update the burst duration profile (step 128). The updated burst duration profile is then used to update the burst duration threshold (step 130), where the invention proceeds to monitor the data rate using the new burst duration threshold. As with the rate profile, longer bursts will tend to raise the duration profile and therefore the burst duration threshold, while shorter ones will lower it. Similar to updating the rate profile then, this process 104 thus adjusts the definition of DDOS attack duration to suit current traffic patterns. Thus, for instance, the detection program 20 will avoid signaling a DDOS false alarm during a short data burst on computers that commonly receive many (non-malicious) short but intense bursts of information.

Figure 3:
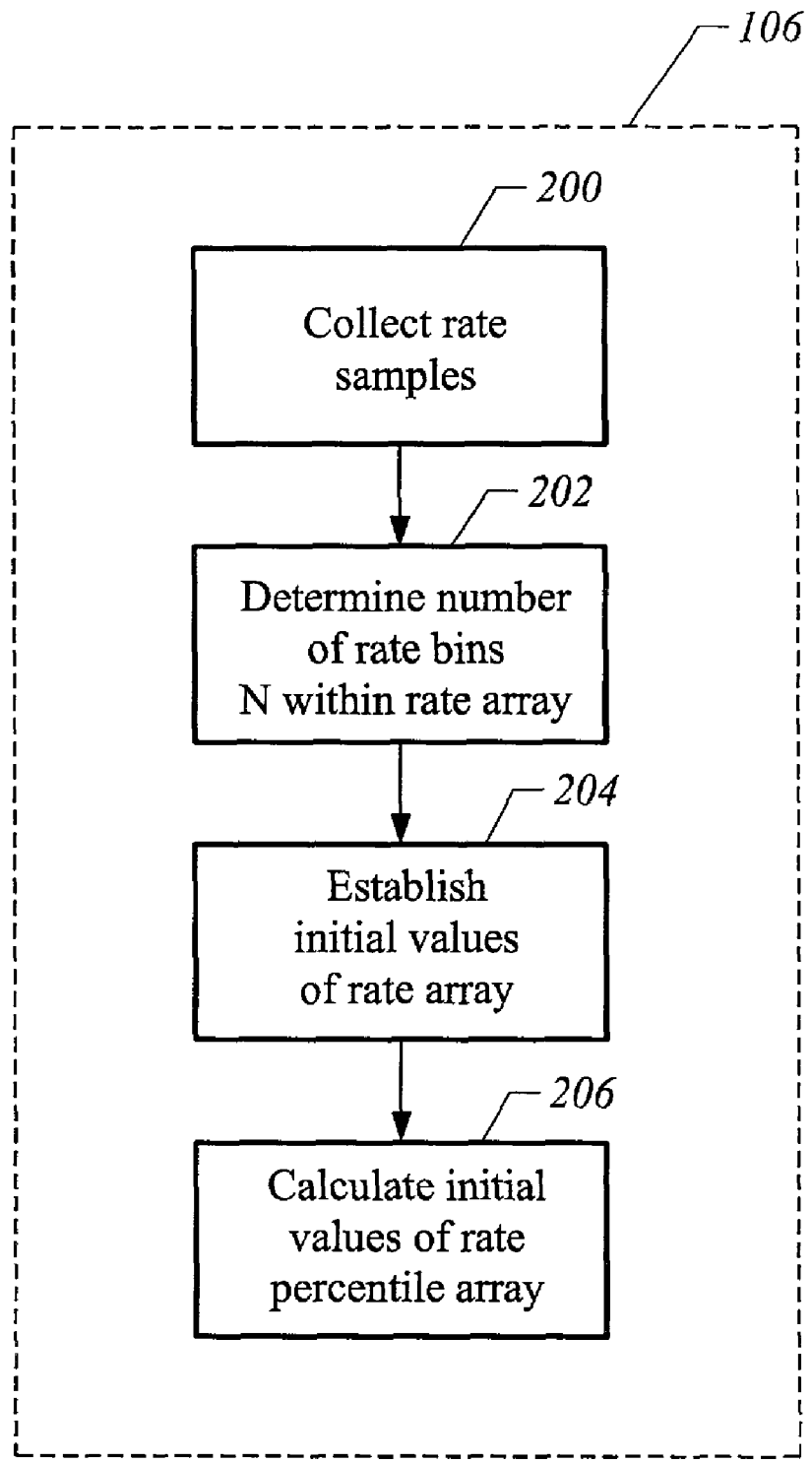
FIG. 3 is a flowchart illustrating the establishment of initial rate values in accordance with an embodiment of the invention.

The above steps illustrate broad concepts associated with one embodiment of the invention. Certain steps are now described in greater detail, namely the steps of initializing and updating the rate and duration profiles. FIG. 3 illustrates step 106, establishing an initial rate profile, in further detail so as to clarify one embodiment of the invention. In this embodiment, the rate profile is represented as a plurality of discrete rate values, each of which represents a rate at which traffic flows into the computer 10. Each of these rate values is used as a "bin" of sorts: rate samples are added to a particular bin depending on their magnitude, so that each bin represents a measure of how often data traffic reaches that particular value.

FIG. 3 illustrates one embodiment of the invention for establishing initial rate values for each bin in the rate profile. In this approach, the rate profile is assumed to be normally distributed. First, the rate sampling routine 22 collects a statistically sufficient number of rate samples (step 200). The number of rate bins N is next specified (step 202). This number simply serves to break the rate profile up into N discrete categories.

The initial values for all N bins of the rate array are then established (step 204). Assume that the N bins are numbered (0) through (N−1), with bin (0) representing the low end of the rate profile and (N−1) the high end. One method of establishing initial values, then, is to calculate the mean and standard deviation of the rate samples collected, and to set bin (0) equal to the mean rate. The calculation of mean and standard deviation statistics is known in the art. For example, as rate samples $x_i$ come in, two numbers are calculated: X=sum of all rate samples $x_i$, and Y=sum of the squares of all rate samples $x_i^2$. After N samples, the mean can be calculated as $x_{avg}$=X/N, and the standard deviation is $x_{std}$=sqrt(Y−N*$x_{avg}^2$)/N. Bin (N−2) is set equal to the mean plus four times the standard deviation, and intermediate bins are assigned rate values uniformly distributed between these two extremes. Bin (N−1), the high bin, is often set to an artificially high value so as to capture all high rate samples.

Note that the setting of initial values is simply intended to provide a rough profile of network traffic, so as to allow this embodiment of the invention to more quickly converge on an accurate rate profile. Values for each rate bin can be set in a number of other ways without deviating from the scope of the invention. These include methods such as simply setting bin values to uniformly increasing rates, or obtaining a number of rate samples and setting bin (0) equal to the lowest sample while setting bin (N−2) equal to the highest. For any such method, the final result should be the same: the updating processes of the invention will eventually allow the rate profile to converge on an accurate representation of network traffic. As a result, the invention should not be interpreted as limited to rate profiles with normally distributed initial values, and instead should be construed to cover simply an arbitrarily-obtained rate profile.

Once the rate profile is established, some mechanism must be provided to update it. In one embodiment of the invention, this mechanism is a rate percentile profile broken into the same number of divisions, or bins, as the rate profile. Each bin of the rate percentile profile is assigned a corresponding bin in the rate profile, and each bin simply stores the percentage of rate samples whose rates are equal to or less than the rate of the corresponding rate profile bin. Thus, for example, bin (0) of the rate percentile profile contains the percentage of rate samples that match or fall below the rate specified in bin (0) of the rate profile. Each successive bin of the rate percentile profile stores a higher value than the last, with bin (N−1) storing the highest percent value. If all rate samples fall below the rate specified by bin (N−1) of the rate profile, then bin (N−1) of the rate percentile profile contains a value of 100%.

One method of utilizing this rate percentile profile to update the rate profile is explained below. But before any updating can occur, the rate percentile profile must first be initialized (step 206). Once rate samples have been collected by step 200 and the rate profile has been initialized in step 204, a rate percentile profile is established containing the same number of bins as the rate profile. In each bin of the rate percentile profile is then stored the percentage of collected rate samples whose rates fall below the rate specified in the corresponding rate bin.

Note that establishing a rate profile and rate percentile profile allows the DDOS detection program 20 to calculate a burst magnitude threshold, as in step 104. In this embodiment, the burst magnitude threshold can be conveniently chosen according to the rate percentile profile, for example the rate corresponding to the 98$^{th}$ percentile, i.e. the rate value below which 98% of rate samples fall. Typically a high percentile value is chosen so as to avoid an excessive number of false alarms, but it should be noted that the exact percentile value chosen can vary without deviating from the scope of the invention.

Similarly, the burst magnitude threshold can be based on additional criteria besides just percentile values from the rate profile. The burst magnitude threshold can, for example, be based on a rate between the 98$^{th}$ percentile and the largest recorded rate sample, or on a mathematical function of the 98$^{th}$ (or other) percentile value. In applying this final criterion, it is often useful to incorporate one or more constants, each of which can be adjusted to control the sensitivity level of attack detection. Intuitively then, adjusting the constants to lower the detection threshold makes it easier for a burst to trigger an attack signal but increases the risk of false alarms, while raising the threshold reduces the risk of false alarms but may risk overlooking some attacks. While these alternate criteria remain within the scope of the invention, it should be noted that some of these approaches require keeping track of the largest rate sample, a task easily accomplished by simply storing the largest value in the rate sample storage 34.

Once an initial rate percentile profile is established, it can then be used to update the rate profile. Observe that the rate percentile profile (and thus the rate profile) can be updated every time traffic is sampled, as every new piece of rate data will slightly alter the percentage values of the rate percentile profile. The only additional information required would be a counter to keep track of the total number of rate samples, so as to allow accurate recalculation of percentile values. While this constant updating is within the scope of the invention, it has potential disadvantages. For instance, frequent updates may result in excessive computational overhead, sapping resources that may be better utilized for other applications. It is also often desirable to assign greater weight to more recent rate samples, due to the fact that older rate samples may not be reflective of current traffic. Such weighting would be difficult if rate samples are simply added into a single aggregate value every time, as older samples would have to be somehow subtracted out, discounted, and added back in. To avoid these problems, updating is accomplished via two intermediate arrays, a short-term count array and a long-term count array. These arrays store rate samples, discount them to account for age, and periodically calculate updated rate profiles.

Figure 4:
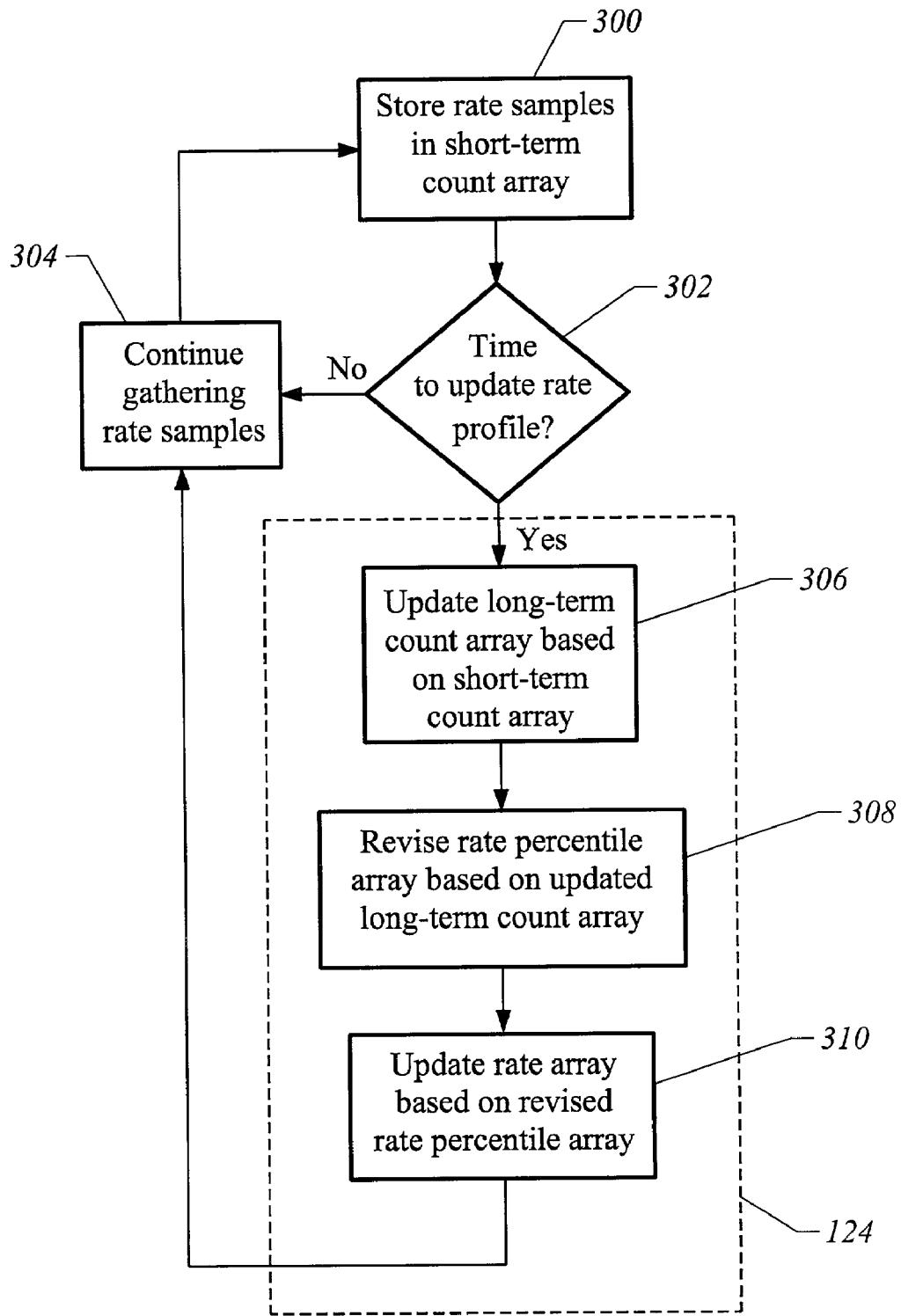
FIG. 4 is a flowchart illustrating rate percentile profile updates performed in accordance with an embodiment of the invention.

FIG. 4 illustrates steps to be performed in using the rate percentile profile to update the rate profile. As the rate sampling routine 22 takes traffic samples, it stores them in a short-term count array (step 300) located within the rate sample storage 34. As this short-term count array is set to contain the same number of elements, or bins, as the rate profile and rate percentile profile, each traffic sample results in incrementing by one the bin corresponding to the appropriate traffic rate. Periodically, the rate profile calculation routine 24 checks to determine whether it should update the rate profile (step 302). If it is not yet time to do so, the rate sampling routine 22 continues gathering rate samples as usual (step 304). If it is time to update the rate profile, the short-term count array is used to update the long-term count array (step 306), which contains the same number of bins and is simply a running count of every rate sampled. In pseudo-code, the algorithm for adding the short-term count array to the long-term count array is as follows:

total_count=0
for (i=0, N−1)
    long_term_count(i)=long_term_count(i)*age_factor+ short_term_count(i)
        short_term_count(i)=0
        total_count=total_count+long_term_count(i)

where age_factor <1.0

In other words, the "old" long-term count array is discounted by an age factor to reduce the impact of any older rate samples. The short-term count array is then added in, resulting in an updated long-term count array that contains all rate sample information but that is also weighted toward more recent rate samples due to the age factor. The short-term count array is then zeroed out and used to collect new rate samples. The total_count value is simply a number reflecting the total number of rate samples collected, with older rate samples discounted.

Observe that the long-term count array essentially keeps a running count of all rate samples ever collected. On certain computers, this may eventually result in overflow errors as the number of rate samples grows too big for the long-term count array to store. This problem can be alleviated by setting the age factor to a sufficiently small value, thus effectively decrementing each rate counter and preventing it from growing too large. The problem can also be addressed via other methods, all in keeping with the scope of the invention, such as periodically dividing every bin in the long-term count array by a multiple of some number like 10, or by subtracting a large constant from every bin. Finally, the problem is also easily solvable by choosing the correct precision value for each counter. For example, if rates are sampled every second and the profiles are updated every hour, a short-term counter will not exceed 60*60=3600. Over time, it can be observed that the upper bound on the total count is 3600/(1−age_factor). Thus, even if age_factor is set as large as 0.99999, a standard double precision counter (currently, 8 bits on most 32 bit machines) should not overflow.

Observe also that this approach to discounting quantities by an age factor need not be limited to the rate sample context. In keeping with the invention, this approach can also be utilized to discount other relevant quantities. For example, one embodiment has been previously discussed in which the burst magnitude threshold is based on a value between the 95$^{th}$ (or some other) percentile value of the rate array, and the largest recorded rate value. While this approach requires storing and updating the largest recorded rate value, it may also be extended to include discounting of this rate value by an age factor. This extension would allow one embodiment of the invention to adjust its recorded maximum rate value according to recent changes in network traffic.

Once the long-term count array is updated, it is used to revise the rate percentile array (step 308). Each bin i of the rate percentile array is recalculated as follows:

rate_percentile(i)=rate_percentile(i−1)+long_term_ count(i)/total_count; (1)

rate_percentile(0)=long_term_count(0)/total_count (2)

In this manner, each bin of the rate percentile array simply represents the percentage of rate samples at or below the corresponding data rate, as discounted for age. After the rate percentile array is updated, it is used to update the rate array (step 310), thus effectively allowing the rate array to shift up or down in response to changes in traffic. In the present embodiment of the invention, the rate profile is shifted up by dividing the largest bin and eliminating the bottom bin. Likewise, the rate profile is shifted down by combining two bins and adding a new bin to the bottom end. A further explanation of these shifting operations is offered in connection with a discussion of FIGS. 5A and 5B below.

The determination of whether to shift is based, as above, on the revised percentile array. In the current embodiment, an arbitrary value percentile_low is chosen, which is typically a small value such as 5%. Another arbitrary value δ is chosen also typically a small value such as 2%. The criteria used to determine whether to shift the rate profile includes:

if rate_percentile(0)−percentile_low>δ ⇒ shift rate profile down (3)

if percentile_low−rate_percentile(0)>δ ⇒ shift rate profile up (4)

In essence, when the bottom bin of the rate percentile array grows too big, this indicates a relatively high number of small data rate samples. This in turn implies that network traffic is slowing. In order to mirror this decrease, the rate profile should be adjusted downward accordingly. Conversely, when the bottom bin of the rate percentile array shrinks too small, this implies an increase in network traffic, meaning the rate profile should be adjusted upward. In a more general case, two parameters percentile_low and percentile_high can be used to define a range of interest for this embodiment of the invention to track. In this case, the rate profile would be shifted up or down depending on whether, and in which direction, this range is exceeded. In a more general case, one can use a parameter pair, such as percentile_low and percentile_high, to define a range of interest for the algorithm to adaptively track.

If condition (3) is met, step 310 acts to shift the rate profile downward. A bin i is chosen such that the quantity:

rate_percentile(i+2)−rate_percentile(i) (5)

is minimized for 1<i<N−2. The bins rate(i+1) and rate(i+2) are combined into a single bin, rate(i+2). Each bin below rate(i+2) is then shifted up one, except for the rate(0) bin, which is divided. The rate(0) bin may be divided in any way without deviating from the scope of the invention, but one effective method is to divide it as follows:

rate(1)=rate(0)

rate(0)=rate(0)*[1−rate_percentile(0)]/[1−percentile_ low] (6)

In other words, the rate(0) bin is divided proportional to the amount by which rate_percentile(0) exceeds percentile_low. Thus, as traffic decreases and the number of small rate samples grows, the rate profile will spawn new, smaller bins to reflect the change. The corresponding bins of the rate percentile, short-term count, and long-term count arrays are also altered in like manner, with rate_percentile(0) being divided in identical proportion to rate(0).

If condition (4) is met, step 310 acts to shift the rate profile upward. The largest bin is divided in two. All bins below it are shifted down one, with the rate(0) and rate(1) bins being combined into a single rate (0) bin. As with condition (3), the largest bin may be divided in any way without deviating from the scope of the invention. However, if the largest bin is rate(i), one method of dividing it is:

rate(i−1)=[rate(i)+rate(i−1)]/2 rate(i)=rate(i)

It should be pointed out that the rate profile can be adjusted to more accurately reflect rate traffic without necessarily shifting the entire profile upward or downward. Rather, various bins can be combined or divided at any time, and for any reason, all of which remains in keeping with the invention. For instance, even when conditions (3) and/or (4) are not met, excessively large rate bins can be divided so as to more accurately discern corresponding rate information. Likewise, exceedingly small rate bins may be unnecessary to provide an accurate picture of rate information, and therefore may be merged into neighboring bins. Similarly, the smallest two consecutive bins can be combined while the largest bin can be divided to keep the total number of bins constant.

As above, the rate percentile profile, short-term count, and long-term count arrays are altered in like manner, for example with rate_percentile(0) and rate_percentile(1) combined into a single bin and rate_percentile(i) divided in the same manner as rate(i).

Attention now turns to duration profile updating, which can be performed in a manner analogous to updating the rate profile. More specifically, a burst duration profile is established containing N bins that break down the distribution of burst durations received. Likewise, a burst duration percentile profile containing N bins is also established, detailing the percentage of bursts whose durations fall at or below the corresponding burst duration value. The burst duration threshold is then chosen from the burst duration percentile profile, e.g. a duration value longer than, say, 95% of bursts. Each time a burst duration is detected at step 106, its duration is recorded and used to update the burst duration profile. This updating occurs similarly to the rate profile, with short-term and long-term burst counts used to revise the burst duration percentile profile, which in turn is used along with a burst_percentile_low value to shift the burst duration profile up or down.

Figure 5A:
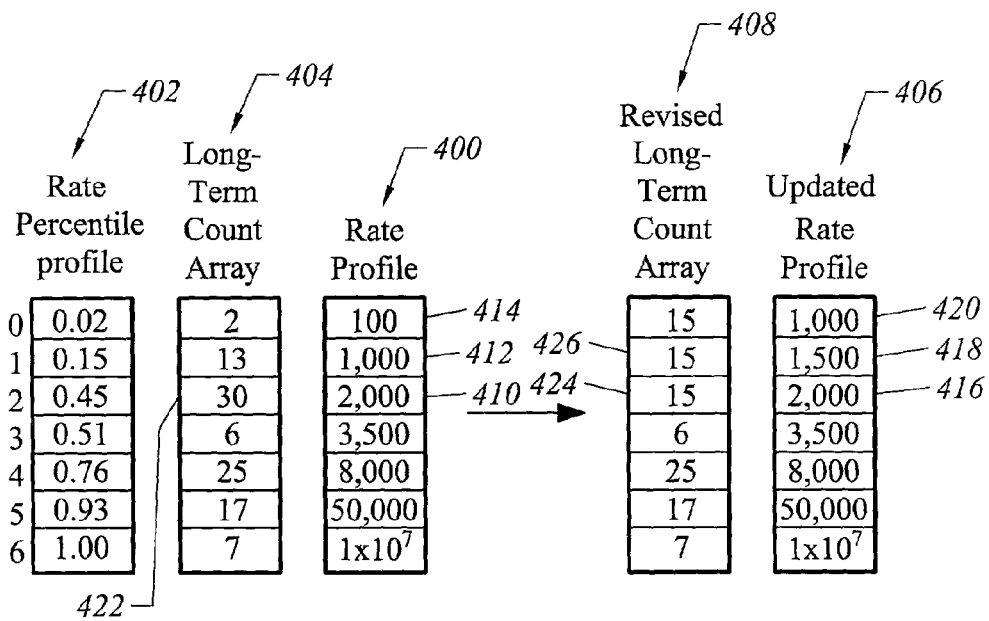
FIG. 5A is a diagram illustrating rate profile updating operations performed in accordance with an embodiment of the invention.

The process of updating both the rate and duration profiles is more easily understood with reference to the following example. FIG. 5A illustrates rate profile updating operations in accordance with one embodiment of the invention, where the rate profile calculation routine 24 acts to shift the rate profile upwards. Shown on the left of FIG. 5A is a rate profile 400 prior to updating, and shown on the right is the same rate profile 406 after the updating process has completed. The rate profile 400 consists of 7 bins, so that N=7. Each successive bin contains a larger data rate value, so that the bins collectively illustrate a profile of the rate at which network traffic is received. Note that the individual data rate values are simply numbers chosen for illustration purposes only. Actual rate values may differ, and may be expressed in packets per second, bytes per second, or any other scale, without deviating from the invention. Here, it is assumed that rate values are measured in units of packets per second.

The corresponding rate percentile profile 402 also contains 7 bins, each of these bins containing the percent of rate samples falling at or below the corresponding rate from the rate profile. Thus, for instance, 2% of previous rate samples have been measured at a rate of 100 packets/second or below. Likewise, 15% of rate samples have been measured at a rate of 1,000 packets/second or less, and so on. Organized in this manner, each successive rate percentile profile bin will always contain a greater value than the last. As mentioned above, the last bin of the rate profile 400 has been set to a large number, to catch all high rate samples. The corresponding bin of the rate percentile profile 402 thus contains a value of 100%.

A long-term count array 404 is also shown, containing the sum of all rate samples divided according to their corresponding rate value. To reduce complexity, it is assumed that the short-term count array (not shown) has already been used to update the long-term count array 404 according to the procedure outlined in step 306 above. It is also assumed that the long-term count array 404 has already been utilized, according to step 308, to update the rate percentile profile 402 according to equations (1) and (2). Discounted for age then, traffic was twice measured at 100 packets/second or below, and measured at 100 packets/second to 1,000 packets/second 13 times. It can be observed from the rate percentile profile 402 and long-term count array 404 that relatively few samples have low values: most appear in the middle to high range of the rate profile. For instance, 30+6+25=61 samples were measured at rates from 1,000 to 8,000 packets/second, while only 13+2=15 were measured at rates of 1,000 packets/second or below. This rate distribution implies that traffic has relatively recently increased, and that the rate profile 400 should be shifted upward to reflect this increase.

If, as above, we assume percentile_low=5%, and $\delta$=2%, then by equation (4) above, it is clear that the criterion for shifting the rate profile up is met: 5%−2%>2%. The rate percentile profile 402 and rate profile 400 are thus shifted up by dividing their largest bins in two and discarding the lowest bin. In this case, the largest rate bin is the rate(2) bin 410, whose corresponding long-term count bin 422 contains 30 rate samples. The rate(2) bin 410 is therefore divided into two bins, the bins below it are shifted downward, and the rate(0) bin 414 is deleted. As above, the rate(2) bin 410 is divided by maintaining the same rate value in the updated rate(2) bin 416, while assigning the new rate(1) bin 418 a value halfway between the old rate(2) bin 410 and rate(1) bin 412. Thus, while the old rate(2) bin 410 and rate(1) bin 412 had rate values of 2,000 and 1,000 packets/second respectively, the updated rate(2) bin 416 and updated rate(1) bin 418 have values of 2,000 and 1,500 packets/second. Note that the old rate(1) bin 412 has been shifted down to become the new rate(0) bin 420, while the old rate(0) bin 414 has been deleted. The remaining bins are unchanged. The rate profile has thus been shifted upward, with the new rate profile 406 having a low value of 1,000 packets/second instead of 100 packets/second.

Corresponding elements of the long-term count array 408 and the rate percentile profile 402 are also updated. Here, then, the lowest two bins of the long-term count array 408 have been added together and shifted downward to reflect the number of rate samples measured at 1,000 packets/second and below, while the bin 422 corresponding to the rate(2) bin 410 has been equally divided between the updated rate(1) bin 418 and rate(2) bin 416. Note here that updating the long-term count array 404 (as well as the short-term count array) requires a certain amount of extrapolation. In keeping with the invention's advantageously small memory footprint, this embodiment of the invention bins rate samples, but does so only by incrementing a counter. The rate samples themselves are not stored. Thus, strictly speaking, bin 422 should not be divided equally into bins 424, 426 as shown. Rather, the first revised bin 426 should contain the number of rate samples falling between 1,000 and 1,500 packets/second. Likewise, the second revised bin 424 should contain the number of rate samples falling between 1,500 and 2,000 packets/second. However, this information is not available. The methods of this embodiment only record the fact that, stored in bin 422, are 30 rate samples falling somewhere between 1,000 and 2,000 packets/second. As the exact values of these 30 rate samples are discarded, this embodiment simply divides them in two and assigns each revised bin 424, 426 equal values collectively adding up to 30.

Observe that the present embodiment acts in this manner only as a way of achieving as small a memory footprint as possible. While they may take up more memory, alternate embodiments can retain more information, and divide rate samples between bins more accurately, without deviating from the spirit of the invention, which includes any known method of dividing an object and assigning certain values to the resulting parts. More powerful systems, or those with ample memory, may take advantage of these alternate embodiments while still remaining within the scope of this invention.

Figure 5B:
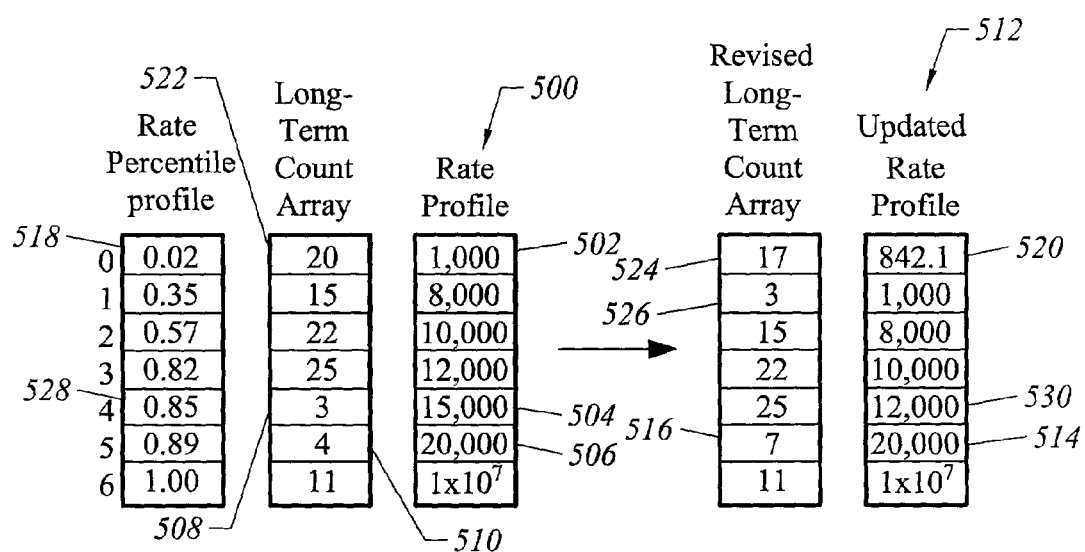
FIG. 5B is a diagram illustrating rate profile updating operations performed in accordance with an embodiment of the invention.

FIG. 5B illustrates rate profile updating operations in accordance with an embodiment of the invention where the rate profile calculation routine acts to shift the rate profile downward. As in FIG. 5A, shown at left is a rate profile 500 prior to updating. Condition (3) is met, as 20%−5%>2%, meaning the rate profile 500 should be shifted down. This is accomplished by dividing the rate(0) bin 502, and combining the two smallest bins according to condition (5) above. Here, condition (5) is met by rate(4) 504 and rate(5) 506, corresponding to the two smallest long-term count bins 508, 510. These two rate bins 504, 506 are thus combined to produce an updated rate profile 512 having an updated rate(5) bin 514. Likewise, the two long-term count bins 508, 510 are combined to yield bin 516.

Next, the bottom end of the rate profile 500 is shifted up by dividing the rate(0) bin 502 according to equation (6), and shifting the other rate bins up. For the current values of rate_percentile(0) 518 and percentile_low (5%), equation (6) produces a value of 842.1 packets/second, the value assigned to the new updated rate(0) 520. The long-term count bin(0) 522 is divided in like proportion, producing revised long-term count bins 524, 526. Note, as above, that the rate samples in long-term count bin(0) 522 are divided identically to the rate(0) bin 502 only because exact rate information on all 20 rate samples is discarded to save memory. Alternate embodiments of the invention may retain this information, while remaining within the scope of the invention, thus producing more exact values for the revised long-term count bins 524, 526. The end result is a rate profile 512 that has been shifted downward, with a new low-end rate of 842.1 packets/second instead of 1,000 packets/second.

In this manner, FIGS. 5A and 5B illustrate shifting of the rate array to mirror changes in traffic. Once this shifting occurs, the steps of the invention proceed to step 104, where this updated rate array is used to re-calculate the burst magnitude threshold. Thus, using FIG. 5B as an example, if the burst magnitude threshold is chosen as the rate value corresponding to the $85^{th}$ percentile value of the rate percentile profile, linear interpolation (or another estimation method, any of which would be consistent with the scope of the invention) would produce a rate ⅗ of the way between bins 530 and 514, or 15,428.6 packets/second.

The monitoring routine 30 then uses this updated burst magnitude threshold, along with an updated burst duration threshold obtained in the same manner, to scan for DDOS attacks. Here, for example, one can choose a rate 20% greater than the $85^{th}$ percentile rate, or 1.2*15,428=18,514 packets/second. Assuming a burst duration profile of (50%: 10 sec, 60%: 20 sec, 70%: 25 sec, 80% 30 sec, 90% 32 sec, 100%: 1000 sec), the $90^{th}$ percentile value is chosen as 32 seconds. The monitoring routine 30 then scans for a burst exceeding 18,514 packets/second, and lasting for at least 32 seconds. If one is found, an attack is signaled.

FIGS. 5A and 5B illustrate the processes of one embodiment used to update the rate profile. As previously mentioned, the burst duration profile is updated in like manner, i.e. with a burst duration percentile profile and a long-term burst count array being utilized to re-calculate the burst duration profile. From this, a new burst duration threshold value is determined, whereupon the monitoring routine 32 utilizes these two updated threshold values to check for DDOS attacks.

Previous embodiments have illustrated rate sampling in a more general context to explain certain aspects of the invention. For instance, previous discussions dealt with DDOS detection in the context of rate sampling in the aggregate. The rate sampling routine 22 measured total traffic, rather than traffic from a particular source or sources. In an alternate embodiment, the rate sampling routine 22 is also capable of sampling only certain IP packets, such as TCP control packets or packets from a known IP address, and filtering out the rest. A rate profile can then be constructed profiling, and adapting to, only this particular type of traffic. Thus, for instance, the monitoring routine 32 can monitor only traffic from a particular computer. Any spike in data transmitted from this computer would indicate a DDOS attack.

The invention can also adapt its rate profile to fit any changes in traffic from this computer, so as to prevent any false alarms if, say, the computer starts sending more information for a legitimate reason. This embodiment has the added advantage of being able to more accurately track the rate at which certain traffic, such as packets from computers known to have launched DDOS attacks in the past, is received. In this manner, this embodiment of the invention can more carefully scrutinize suspicious traffic, and can more readily detect DDOS attacks.

Note here that the ability to identify network traffic, especially IP packets, according to its source or type is known in the art. For instance, it is known that TCP control packets can be identified by their header, which is organized in a known and specified format and includes characteristic identifying information such as a synchronize flag, an acknowledgement flag, and a source port number. The invention thus includes the ability to parse and separate network traffic into subsets by any known means, and to subsequently profile only those subsets for signs of a DDOS attack.

In a further alternate embodiment, multiple rate profiles are saved and loaded as necessary. While rate traffic varies somewhat smoothly over time, there exist certain periods when rate traffic is known to climb or drop suddenly. For example, while rate traffic typically slows during the evening and night, it may tend to jump suddenly during weekday morning hours as employees begin work. Also, traffic may be known to rise quickly during specified times when network data are being backed up, or saved.

While the invention has disclosed a rate profile capable of adapting to these changes in traffic, the process of altering rate profiles and rate duration profiles is only performed periodically and thus takes some time, especially if the period between updates is set to a relatively high length of time. In the meantime, sudden but legitimate traffic increases such as those described above may trigger a number of false DDOS alarms before the profiles adapt to the higher network load. To help alleviate this problem, a number of rate profiles corresponding to these higher (or lower, as the case may be) traffic rates can be used. For instance, the invention can be utilized during a weekday morning to determine a typical rate profile for that time. This profile can be stored along with other profiles corresponding to times such as network backup periods. These profiles can then be loaded into the monitoring routine 32 at the appropriate times in anticipation of a surge in traffic, thus preventing false DDOS alarms.

It should be noted that this embodiment can operate with an arbitrary number of stored profiles, to be loaded at arbitrary times whenever increases or decreases in network traffic are expected. Thus, for example, this embodiment can store a profile for weekdays and a different one for weekends. It can also store a different profile for each day of the week, or even different profiles for different times of the day. In this manner, the invention can more quickly adapt its profiles to fit even sudden changes in traffic.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A method of identifying a distributed denial of service attack executed by a computer programmed to perform the steps of:

determining a rate profile corresponding to information transfer rates at which information is received from a network, utilizing a processor, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;

establishing a burst magnitude threshold based upon said rate profile;

calculating a burst duration profile characterizing periods of time during which said information transfer rate exceeds said burst magnitude threshold;

defining a burst duration threshold based upon said burst duration profile;

identifying a distributed denial of service attack when said information transfer rate exceeds said burst magnitude threshold for a period of time exceeding said burst duration threshold;

updating said rate profile to reflect a change in said information transfer rate, so as to create an updated rate profile; and revising said burst magnitude threshold based upon said updated rate profile;

wherein said rate profile is updated based on a rate percentile profile, the rate percentile profile including a same number of bins as said rate profile, each of the bins of the rate percentile profile assigned to one of the bins of said rate profile and storing a percentage of identified information transfer rate values that are equal to or less than the information transfer rate magnitude of the one of the bins of said rate profile to which the bin of the percentile profile is assigned.

2. The method of claim 1 wherein said updating further includes updating a rate profile comprising a plurality of rate categories, and dividing one or more categories of said plurality of rate categories.

3. The method of claim 1 wherein said updating further includes updating a rate profile comprising a plurality of rate categories, and combining two or more categories of said plurality of rate categories.

4. The method of claim 1 further including the steps of updating said burst duration profile by incorporating into said burst duration profile information on the duration of an increase in said information transfer rate, so as to create an updated burst duration profile, and revising said burst duration threshold based upon said updated burst duration profile.

5. The method of claim 4 wherein said updating further includes updating a burst duration profile comprising a plurality of burst duration categories, and dividing one or more categories of said plurality of burst duration categories.

6. The method of claim 4 wherein said updating further includes updating a burst duration profile comprising a plurality of burst duration categories, and combining two or more categories of said plurality of burst duration categories.

7. A method of identifying a distributed denial of service attack executed by a computer programmed to perform the steps of:

establishing a rate profile describing a range over which an information transfer rate may vary, utilizing a processor, said information transfer rate being a rate at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;

calculating a burst magnitude threshold from said rate profile, said burst magnitude threshold generally defining an increase in said information transfer rate;

determining a burst duration profile characterizing periods of time over which said increase may be maintained;

assessing a burst duration threshold from said burst duration profile;

identifying when said information transfer rate exceeds said burst magnitude threshold for a length of time exceeding said burst duration threshold;

updating said rate profile to reflect a change in said information transfer rate, so as to create an updated rate profile; and revising said burst magnitude threshold based upon said updated rate profile;

wherein said rate profile is updated based on a rate percentile profile, the rate percentile profile including a same number of bins as said rate profile, each of the bins of the rate percentile profile assigned to one of the bins of said rate profile and storing a percentage of identified information transfer rate values that are equal to or less than the information transfer rate magnitude of the one of the bins of said rate profile to which the bin of the percentile profile is assigned.

8. The method of claim 7 wherein said updating further includes updating a rate profile comprising a plurality of rate categories, and dividing one or more categories of said plurality of rate categories.

9. The method of claim 7 wherein said updating further includes updating a rate profile comprising a plurality of rate categories, and combining two or more categories of said plurality of rate categories.

10. The method of claim 7 further including the steps of updating said burst duration profile by incorporating into said burst duration profile information on the duration of said increase in said information transfer rate, so as to create an updated burst duration profile, and revising said burst duration threshold based upon said updated burst duration profile.

11. The method of claim 10 wherein said updating further includes updating a burst duration profile comprising a plurality of burst duration categories, and dividing one or more categories of said plurality of burst duration categories.

12. The method of claim 10 wherein said updating further includes updating a burst duration profile comprising a plurality of burst duration categories, and combining two or more categories of said plurality of burst duration categories.

13. A non-transitory computer readable medium encoded with a computer program, comprising:
   instructions to determine a rate profile corresponding to information transfer rates at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;
   instructions to establish a burst magnitude threshold based upon said rate profile;
   instructions to calculate a burst duration profile characterizing periods of time during which said information transfer rate exceeds said burst magnitude threshold;
   instructions to define a burst duration threshold based upon said burst duration profile;
   instructions to identify a distributed denial of service attack when said information transfer rate exceeds said burst magnitude threshold for a period of time exceeding said burst duration threshold;
   instructions to update said rate profile to reflect a change in said information transfer rate, so as to create an updated rate profile; and
   instructions to revise said burst magnitude threshold based upon said updated rate profile;
   wherein the computer program is operable such that said rate profile is updated based on a rate percentile profile, the rate percentile profile including a same number of bins as said rate profile, each of the bins of the rate percentile profile assigned to one of the bins of said rate profile and storing a percentage of identified information transfer rate values that are equal to or less than the information transfer rate magnitude of the one of the bins of said rate profile to which the bin of the percentile profile is assigned.

14. The non-transitory computer readable medium of claim 13 wherein said instructions to update further include instructions to update a rate profile comprising a plurality of rate categories, and instructions to divide one or more categories of said plurality of rate categories.

15. The non-transitory computer readable medium of claim 13 wherein said instructions to update further include instructions to update a rate profile comprising a plurality of rate categories, and instructions to combine two or more categories of said plurality of rate categories.

16. The non-transitory computer readable medium of claim 13 further including instructions to update said burst duration profile by incorporating into said burst duration profile information on the duration of an increase in said information transfer rate, so as to create an updated burst duration profile, and instructions to revise said burst duration threshold based upon said updated burst duration profile.

17. The non-transitory computer readable medium of claim 16 wherein said instructions to update further include instructions to update a burst duration profile comprising a plurality of burst duration categories, and instructions to divide one or more categories of said plurality of burst duration categories.

18. The non-transitory computer readable medium of claim 16 wherein said instructions to update further include instructions to update a burst duration profile comprising a plurality of burst duration categories, and instructions to combine two or more categories of said plurality of burst duration categories.

19. A non-transitory computer readable medium encoded with a computer program, comprising:
   instructions to establish a rate profile describing a range over which an information transfer rate may vary, said information transfer rate being a rate at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;
   instructions to calculate a burst magnitude threshold from said rate profile, said burst magnitude threshold generally defining an increase in said information transfer rate;
   instructions to determine a burst duration profile characterizing periods of time over which said increase may be maintained;
   instructions to assess a burst duration threshold from said burst duration profile;
   instructions to identify when said information transfer rate exceeds said burst magnitude threshold for a length of time exceeding said burst duration threshold;
   instructions to update said rate profile to reflect a change in said information transfer rate, so as to create an updated rate profile; and
   instructions to revise said burst magnitude threshold based upon said updated rate profile;
   wherein the computer program is operable such that said rate profile is updated based on a rate percentile profile, the rate percentile profile including a same number of bins as said rate profile, each of the bins of the rate percentile profile assigned to one of the bins of said rate profile and storing a percentage of identified information transfer rate values that are equal to or less than the information transfer rate magnitude of the one of the bins of said rate profile to which the bin of the percentile profile is assigned.

20. The non-transitory computer readable medium of claim 19 wherein said instructions to update further include instructions to update a rate profile comprising a plurality of rate categories, and instructions to divide one or more categories of said plurality of rate categories.

21. The non-transitory computer readable medium of claim 19 wherein said instructions to update further include instructions to update a rate profile comprising a plurality of rate categories, and instructions to combine two or more categories of said plurality of rate categories.

22. The non-transitory computer readable medium of claim 19 further including instructions to update said burst duration profile by incorporating into said burst duration profile information on the duration of said increase in said information transfer rate, so as to create an updated burst duration profile, and instructions to revise said burst duration threshold based upon said updated burst duration profile.

23. The non-transitory computer readable medium of claim 22 wherein said instructions to update further include instructions to update a burst duration profile comprising a plurality of burst duration categories, and instructions to divide one or more categories of said plurality of burst duration categories.

24. The non-transitory computer readable medium of claim 22 wherein said instructions to update further include instructions to update a burst duration profile comprising a plurality of burst duration categories, and instructions to combine two or more categories of said plurality of burst duration categories.

25. The method of claim 1, wherein exceeding said burst magnitude threshold with a predetermined duration raises said burst duration profile and raises said burst duration threshold.

26. The method of claim 1, wherein the bins are included in an array and the information transfer rate magnitudes of the bins are set at a uniformly increasing information transfer rate magnitude.

27. The method of claim 1, wherein the bins are included in an array and the information transfer rate magnitudes of the bins are set in an increasing order based on identified information transfer rate values, such that a first one of the bins in the array represents a lowest identified information transfer rate value and a last one of the bins in the array represents a highest identified information transfer rate value.

28. The method of claim 1, wherein a bin of the rate percentile profile that is assigned to a bin of said rate profile with a highest information transfer rate magnitude contains a value of 100% if all identified information transfer rate values are below the information transfer rate magnitude of the bin of said rate profile.

29. The method of claim 1, wherein the percentage is calculated based on a counter which counts a total number of identified information transfer rate values.

30. A method of identifying a distributed denial of service attack executed by a computer programmed to perform the steps of:
    determining a rate profile corresponding to information transfer rates at which information is received from a network, utilizing a processor, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;
    establishing a burst magnitude threshold based upon said rate profile;
    calculating a burst duration profile characterizing periods of time during which said information transfer rate exceeds said burst magnitude threshold;
    defining a burst duration threshold based upon said burst duration profile;
    identifying a distributed denial of service attack when said information transfer rate exceeds said burst magnitude threshold for a period of time exceeding said burst duration threshold;
    updating said rate profile to reflect a change in said information transfer rate, so as to create an updated rate profile; and
    revising said burst magnitude threshold based upon said updated rate profile;
    wherein said rate profile is updated utilizing a short-term array and a long-term array, the short-term array storing more recently identified information transfer rates and the long-term array storing less recently identified information transfer rates, and wherein the information transfer rates stored in the long-term array are discounted such that a weight given to the more recent information transfer rates is greater than a weight given to the less recent information transfer rates.

31. The method of claim 1, wherein said rate profile is updated by dividing a bin with the largest number of occurrences.

32. The method of claim 1, wherein said rate profile is updated by combining two of the bins of said rate profile and adding a new bin to said rate profile, the new bin representative of a lowest information transfer rate magnitude among all of the bins.

33. A method of identifying a distributed denial of service attack executed by a computer programmed to perform the steps of:
    establishing a rate profile describing a range over which an information transfer rate may vary, utilizing a processor, said information transfer rate being a rate at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;
    calculating a burst magnitude threshold from said rate profile, said burst magnitude threshold generally defining an increase in said information transfer rate;
    determining a burst duration profile characterizing periods of time over which said increase may be maintained;
    assessing a burst duration threshold from said burst duration profile;
    identifying when said information transfer rate exceeds said burst magnitude threshold for a length of time exceeding said burst duration threshold;
    updating said rate profile to reflect a change in said information transfer rate, so as to create an updated rate profile; and
    revising said burst magnitude threshold based upon said updated rate profile;

wherein said rate profile is updated utilizing a short-term array and a long-term array, the short-term array storing more recently identified information transfer rates and the long-term array storing less recently identified information transfer rates, and wherein the information transfer rates stored in the long-term array are discounted such that a weight given to the more recent information transfer rates is greater than a weight given to the less recent information transfer rates.

34. A non-transitory computer readable medium encoded with a computer program, comprising:

instructions to determine a rate profile corresponding to information transfer rates at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;

instructions to establish a burst magnitude threshold based upon said rate profile;

instructions to calculate a burst duration profile characterizing periods of time during which said information transfer rate exceeds said burst magnitude threshold;

instructions to define a burst duration threshold based upon said burst duration profile;

instructions to identify a distributed denial of service attack when said information transfer rate exceeds said burst magnitude threshold for a period of time exceeding said burst duration threshold;

instructions to update said rate profile to reflect a change in said information transfer rate, so as to create an updated rate profile; and instructions to revise said burst magnitude threshold based upon said updated rate profile;

wherein the computer program is operable such that said rate profile is updated utilizing a short-term array and a long-term array, the short-term array storing more recently identified information transfer rates and the long-term array storing less recently identified information transfer rates, and wherein the information transfer rates stored in the long-term array are discounted such that a weight given to the more recent information transfer rates is greater than a weight given to the less recent information transfer rates.

35. A non-transitory computer readable medium encoded with a computer program, comprising:

instructions to establish a rate profile describing a range over which an information transfer rate may vary, said information transfer rate being a rate at which information is received from a network, said rate profile including a plurality of information transfer rate values, each information transfer rate value representing a sampled rate at which information is transferred, and said rate profile including a plurality of bins each representative of a different information transfer rate magnitude, wherein each information transfer rate value is added to one of the bins based on a magnitude of the information transfer rate value such that each bin represents a number of occurrences of information transfer rates with magnitudes that match the information transfer rate magnitude represented by the bin;

instructions to calculate a burst magnitude threshold from said rate profile, said burst magnitude threshold generally defining an increase in said information transfer rate;

instructions to determine a burst duration profile characterizing periods of time over which said increase may be maintained;

instructions to assess a burst duration threshold from said burst duration profile;

instructions to identify when said information transfer rate exceeds said burst magnitude threshold for a length of time exceeding said burst duration threshold;

instructions to update said rate profile to reflect a change in said information transfer rate, so as to create an updated rate profile; and instructions to revise said burst magnitude threshold based upon said updated rate profile;

wherein the computer program is operable such that said rate profile is updated utilizing a short-term array and a long-term array, the short-term array storing more recently identified information transfer rates and the long-term array storing less recently identified information transfer rates, and wherein the information transfer rates stored in the long-term array are discounted such that a weight given to the more recent information transfer rates is greater than a weight given to the less recent information transfer rates.

\* \* \* \* \*